April 16, 1968     T. O. HOPPER     3,378,673

ELECTRICALLY HEATED HOSE ASSEMBLY

Filed Oct. 18, 1965

INVENTOR.
THOMAS O. HOPPER
BY *Fishburn & Gold*
ATTORNEYS

United States Patent Office 3,378,673
Patented Apr. 16, 1968

3,378,673
ELECTRICALLY HEATED HOSE ASSEMBLY
Thomas O. Hopper, 145 N. Grant,
Colby, Kans. 67701
Filed Oct. 18, 1965, Ser. No. 496,785
1 Claim. (Cl. 219—301)

ABSTRACT OF THE DISCLOSURE

A water supply conduit protected from freezing under cold conditions, and including an elongate flexible tubular body in the form of a hose having couplings at opposed ends. The hose has a heater structure spirally wrapped thereon and in the form of a double row of high resistance electrical wires covered with heat transmittable electrical insulation, the wires being connectable to a source of electrical power, and having a thermostat in contact with the body for controlling electrical supply, a layer of molding material covering the heater and thermostat and maintaining the same against the surface of the body, and a layer of reflective covering secured by adhesive to the surface of the retaining material to reflect inwardly heat radiated from the heater tape.

---

It is often necessary to expose liquid supply conduits to temperatures below freezing, for example, in connecting water lines to a house trailer, outside stock watering systems or the like. To prevent the water from freezing in the conduit, artificial heating of the conduit has been suggested and used but the heating systems for this purpose have often proved unsatisfactory for various reasons.

Electric heater tapes in wrapped helical contact with such pipes or conduits constitute one method of artificial heating in common use; however, certain difficulties are normally associated with their use. If the heater tape is exposed to the elements, excessive heat loss will result with the danger of freezing in spite of the tape and also the use of electrical current will tend to be excessive. To overcome this, it has been a common practice to wrap the pipe and heater tape with a layer of bulky insulating material, such as fiberglass or mineral wool, which may, in turn, be covered with a vapor barrier to keep out moisture; however, this has resulted in a very bulky supply system and the insulation and covering are easily torn or otherwise damaged. When the vapor barrier is broken, moisture can enter, reducing the effectiveness of the insulation.

In the practice of this invention, it has been discovered that the use of a highly reflective layer on the exterior surface of the conduit or pipe, which reflective layer covers a tough molding layer embedding the heater tape therein and against the pipe, results in a heated liquid supply which is durable and highly effective against heat loss and without the large bulk associated with bulky insulation material.

It is, therefore, the principal objects of the present invention to provide a heated conduit for liquid supply systems exposed to cold temperatures which is not of substantially greater bulk than the bare conduit; to provide such a supply conduit which is highly effective in maintaining the contents of the conduit above freezing temperature without undue heat loss or current drain; to provide such a conduit which is rugged and resists damage by blow or abrasion; to provide such a conduit wherein a broken outer layer does not materially reduce the effectiveness thereof; and to provide such a device which is convenient in use and relatively low in cost.

Other objects and advantages of this invention will become apparent from the following description taken in connection with the accompanying drawings wherein are set forth by way of illustration and example certain embodiments of this invention.

Figure 1:
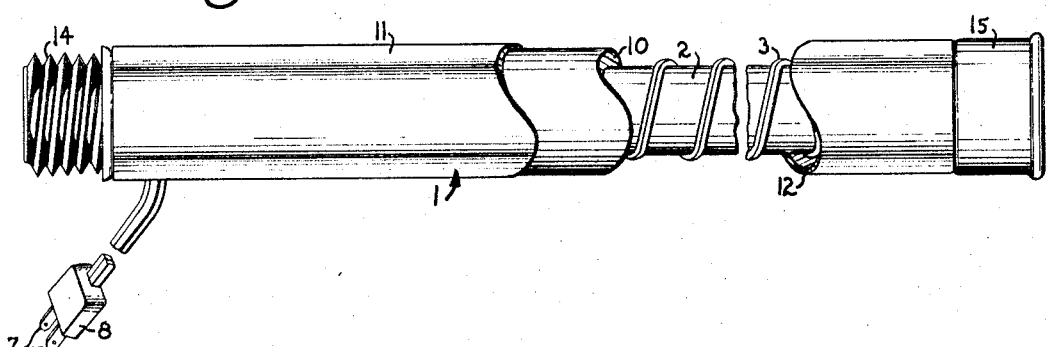
FIG. 1 is a side elevational view of a heated conduit system embodying this invention with portions broken away to show the several layers thereof.
Figure 2:
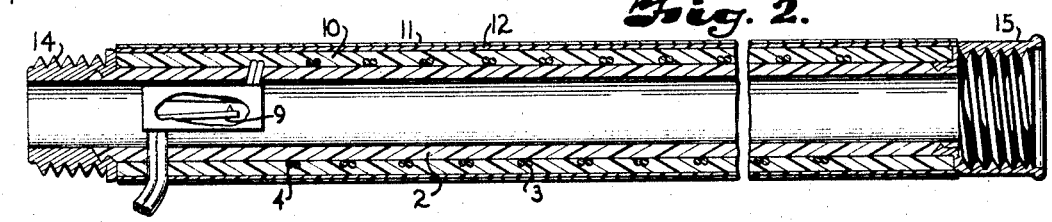
FIG. 2 is a partially schematic longitudinal cross-sectional view of the heated conduit of FIG. 1 showing further details of construction.
Figure 3:
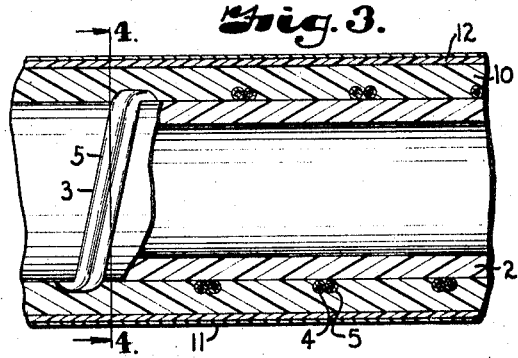
FIG. 3 is a fragmentary longitudinal cross-sectional view of the conduit on an enlarged scale.
Figure 4:
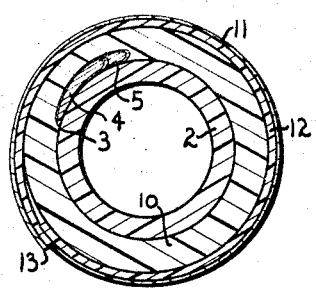
FIG. 4 is a transverse cross-sectional view taken on the lines 4—4, FIG. 3.

Referring to the drawings in more detail:

The reference numeral 1 generally indicates a section of water carrying conduit or hose embodying this invention. The hose 1 comprises an inner, preferably flexible, elongated body 2 of a material having the necessary strength required, for example, a reinforced synthetic resin such as vinyl. The body 2 is spirally wrapped with a heater tape 3 comprising a double row of relatively high resistance wires 4 covered with heat transmittable electrical insulation 5. The heater tape 3 is wrapped in spaced coils along the body 2 which are positioned apart according to the heat generating ability of the tape, the maximum low temperature and wind movements expected in use, and the type of electrical supply available for heat generation.

The wires 4 form a circuit which comprises a single elongated loop directed across the prongs 7 of an electrical plug 8 of the type used for connecting to commercial electrical power. A thermostat schematically shown at 9 is of the well known type adapted to interrupt the circuit between the prongs 7 when the body 2 of the hose attains a desired temperature above freezing. The thermostat 9 is maintained in contact with outer surface of the body 2 and is covered by a layer 10 described below so as to be sensitive primarily to the temperature of the body 2 rather than the outside temperature.

The heater tape 3 and thermostat 9 are maintained in contact and in desired position against the body 2 by a layer of molding material 10 in which these parts become embedded. The molding material 10 is preferably a synthetic resin cured in place and may be similar in resin composition to the body 2 so as to retain and protect the heater tape and yet not unduly restrict the flexibility of the body 2. The layer 10 is also quite abrasion and blow resistent and further serves to increase the bursting strength of the body 2.

An important feature of this invention resides in a reflective covering or layer 11 over the layer of molding material 10. The layer 11 is reflective on the inside surface and preferably on both the inside and outside surfaces thereof and is secured to the layer 10 by means of a suitable adhesive 12 therebetween. The reflective layer 11 may take the form of an elongated sheet which is extended lengthwise of the hose 1 and wrapped therearound with the side edges overlapping as at 13 so that the layer 10 is completely covered. If desired, the reflective layer 11 may take the form of a tape for spiral wrapping about the hose.

It has been determined that the use of the reflective layer 11 in the manner noted causes heat from the heater tape 3 to be reflected back toward the center of the hose 1 to a great degree thereby avoiding a substantial measure of the heat loss which would otherwise occur. The reflective layer 11 in combination with the molding material also presents a relatively rugged and hard surface and undersurface whereupon the hose assembly is not susceptible to tearing or other damage in the manner of a hose wrapped with bulky deformable insulation. Further, the increase in bulk due to the layers 10 and 11 is relatively negligible so that the hose is easily threaded through narrow openings and passageways which could not be used to receive a heated hose wrapped with a bulkier material.

The use of the molding layer 10 and reflective layer 11 further does not present a moisture problem since a tear or break in the surface will only expose the weather resistent molding material 10 and not absorbent insulating material.

The body 2 of the hose section embodying this invention preferably includes a male fitting 14 at one end thereof and female fitting 15 at the other end thereof for easily connecting same as a unit between conduit points exposed to freezing temperatures. If desired, several hose sections may be joined toegther to form a heated hose of suitable length for the particular installation, in which case, each of the plugs 8 may be engaged with a common power source.

It is to be understood that while one form of this invention has been illustrated and described, it is not to be limited thereto except insofar as such limitations are included in the following claim.

What I claim and desire to secure by Letters Patent is:

1. A heated hose assembly for maintaining a source of water liquid under freezing ambient conditions comprising:
    (a) a tubular synthetic resin conduit having coupling members at opposite ends thereof,
    (b) electrical heater tape spiraled about said conduit for substantially the length thereof between said coupling members, said heater tape including high resistance electrical wires in a heat transmittable electrical insulation,
    (c) a layer of retaining material extending between said coupling members,
    (d) a reflective layer secured to and completely covering the outer surface of said retaining material layer for reflecting heat radiated by said heater tape toward said conduit,
    (e) adhesive means adhering the reflective layer to said retaining material layer,
    (f) means for connecting the heater tape wires to a source of electrical current,
    (g) and thermostat means connected to the heater tape and in direct contact with the outer surface of the conduit adjacent one of the couplings and responsive to temperature of the conduit for controlling energization of the heater tape,
    (h) said retaining material being of synthetic resin molding material similar in composition to the composition of the conduit and cured in place and completely covering the thermostat means and said heater tape to maintain the heater tape and thermostat means in contact with the outer surface of the conduit.

References Cited

UNITED STATES PATENTS

| 1,105,795 | 8/1914 | Johnston | 219—301 X |
| 1,995,302 | 3/1935 | Goldstein | 219—301 |
| 2,243,220 | 5/1941 | Pitman | 219—301 X |
| 2,274,839 | 3/1942 | Marick | 219—522 |
| 2,617,916 | 11/1952 | Neidnig | 219—549 X |
| 2,760,047 | 8/1956 | Hanson | 219—301 X |
| 2,793,280 | 5/1957 | Harvey | 219—549 X |
| 2,915,615 | 12/1959 | Leipold et al. | |
| 3,120,600 | 2/1964 | True | 219—301 |

FOREIGN PATENTS

| 372,745 | 5/1932 | Great Britain. |
| 527,759 | 10/1940 | Great Britain. |

ANTHONY BARTIS, *Primary Examiner.*